June 21, 1955 C. L. WISE Re. 24,026

VENTILATORS FOR HAY AND GRAIN CONTAINERS

Original Filed Oct. 19, 1946

INVENTOR
CLARENCE L. WISE
BY John A. McLeran
ATTORNEY

United States Patent Office

Re. 24,026
Reissued June 21, 1955

24,026

VENTILATORS FOR HAY AND GRAIN CONTAINERS

Clarence L. Wise, Springfield, Ohio

Original No. 2,580,872, dated January 1, 1952, Serial No. 704,327, October 19, 1946. Application for reissue March 2, 1953, Serial No. 339,948

4 Claims. (Cl. 138—50)

Matter enclosed in heavy brackets [ ] appears in the original patent but forms no part of this reissue specification; matter printed in italics indicates the additions made by reissue.

FLEXIBLE AND EXTENSIBLE AIR CONDUIT

This invention relates to improvements in air conduits for use in supplying air to corn, hay and similar materials in bins, cribs and other grain, or hay containers, and has for its object to provide an air conduit that is flexible and may be made in any desired length.

It is also an object of this invention to provide a flexible air conduit, composed of sections united together to form a single conduit of any desired length and of uniform diameter.

It is also an object of this invention to provide an air conduit composed of sections of coiled wire, the end of each section being constructed to co-operate with the end of another section to form a conduit of various lengths.

It is also an object of this invention to provide a conduit section, composed of a coil of wire, surrounded by a jacket of burlap or canvas, so that the air may pass from the conduit out through the side of the conduit, but smaller grain cannot pass into the conduit.

These and other advantages will appear from the following description taken in connection with the drawings in which.

In the various figures, there is shown a plurality of sections of coils of wire formed to cooperate in producing a ventilating and drying conduit. These sections of coiled wire may be united to form a conduit of any desired length and the coil may be varied in size to form a conduit of various dimensions.

Figure 1:
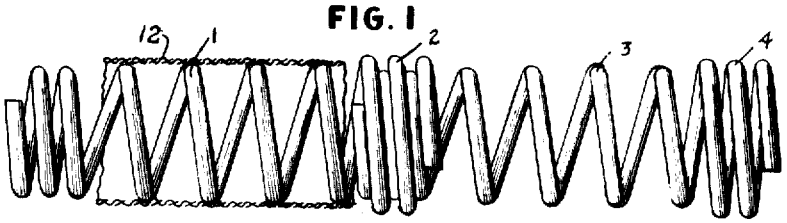
Figure 1 shows an air conduit composed of two or more sections, one end of each being larger than the other part of the section, and the smaller end of one section threaded into the large end of another section.

In Figure 1, there is shown a coil, which is of uniform size throughout, except that at one end 2, the coil is enlarged to receive the small end of another coil. In the present instance, this other coil is indicated by the numeral 3, which is uniform in size throughout its length, except for coils 4, that are enlarged to receive the small end of another coil. These coils are threaded one on to another. These coils when used in any number form a conduit of uniform diameter throughout its length. In each coil the end turns are closer together than the other coils. The space between the end turns is slightly less than the diameter of the wire forming the coil, whereby there is no lateral movement of the ends of the coils with relation to each other.

Figure 2:
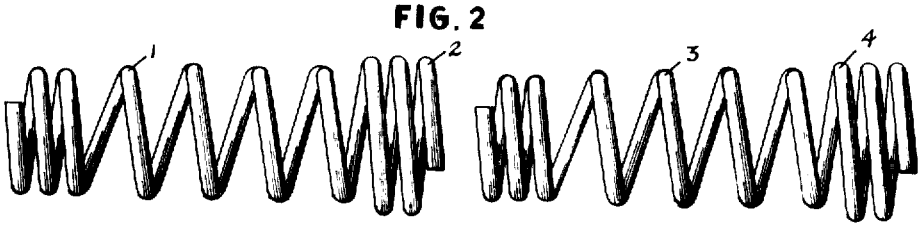
Figure 2 shows an air conduit similar to that shown in Figure 1, except that the sections are not connected.
Figure 3:
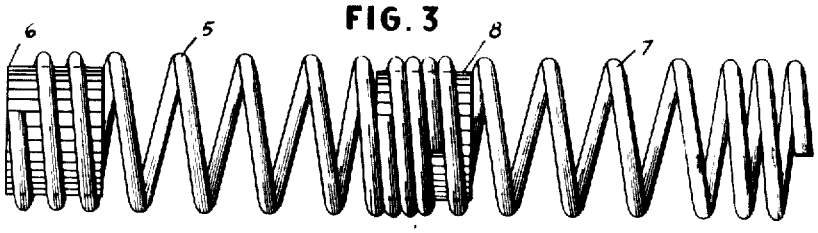
Figure 3 shows an air conduit composed of two sections of coiled wire, one end of each section having therein a band around which the other end of the other section is threaded.
Figure 4:
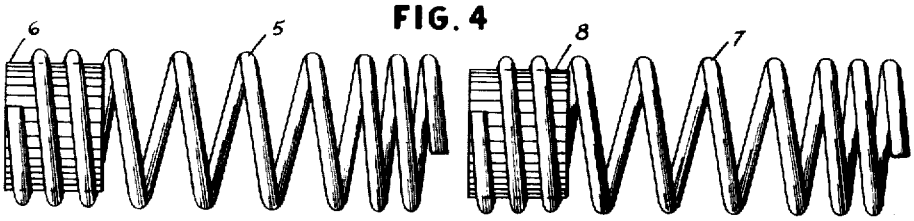
Figure 4 shows a conduit similar to that shown in Figure 3, except that the sections are not connected.

Figure 1, illustrates these two coils, united while, Figure 2, shows the coil separated and as they appear before they are united to form a conduit. *The coils are held against relative lateral and longitudinal movements by the friction between the coils.* In Figures 3 and 4 there is shown a form of conduit in which the ends of the coils are prevented of lateral movement in regards to each other by means of bands 6 and 8. The number 5, is used to designate a coil that is uniform in size, throughout its length. In one end of this coil 5, is the band 6, which serves as part of a coupling element for the uniting of two coils, such as coil 5, and a coil 7. The coil 7 has in one end thereof the band 8, serving the same purpose as the band 6. The end of coil 5, free from the band, is threaded on the end of coil 7, which has the band 8. The end of the coil threaded onto the band is slightly larger than the rest of the coil so that it may easily turn on the band. The bands 6 and 8 prevent the ends of the coils slipping laterally with each other and the slightly enlarged ends of the coils provide space for the bands without decreasing the inside diameter of the conduit.

Figure 3 shows the coils 5 and 7, united in the manner to form a conduit. Any number of these coils may be united as shown in Figure 3, to form conduits of any desired length.

In Figure 4, these two coils are shown apart, and in the position to be threaded one on to the other. It will be observed that in the form shown in Figures 1, 2, 3 and 4, the sections are united directly one to another by threading one onto the other.

Figure 5:
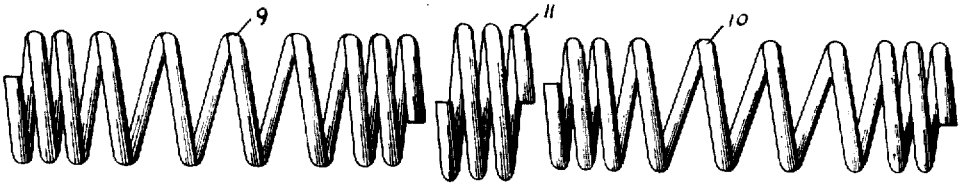
Figure 5 shows elements of an air conduit composed of a pair of sections of coiled wire, the sections being of like diameter throughout. These sections are united by a short section of coiled wire the short section being of greater diameter than the main sections.

In the form shown in Figure 5, the sections are united by means of separate elements.

In Figure 5, the coils shown are indicated by the numerals 9 and 10. These coils are uniform in size throughout, so that when they are united end to end they form a continuous uniform passageway for air and heat to pass through.

The coils 9 and 10, are connected by means of a closely coiled, larger coil 11, to form a continuous conduit. Each end of the coils 9 and 10, is threaded into one end of the larger coil 11.

There may be in a single conduit [formed of] a large number of the coils 9 and 10, united by the larger coils 11.

The coils 9 and 10, may be of any desired length and of any desired size, and are united by means of coils 11, which have about four turns of closely coiled wire in their construction. Each one of the various coils has its end coils, about two, closer together than the coils between the ends. The end coils must be closer together, so that they can serve as threads in uniting the various coils or elements. The coils between the end coils may be spaced apart any desired distance.

For the purpose of preventing grain and small particles from getting in the conduit, the conduit as a whole may be surrounded by a wrapper, or cover of burlap, canvas, or very closely meshed wire, as indicated by the numeral 12.

What I claim as my invention is:

[1. In a conduit for air, a plurality of elements forming said conduit, each element being formed of a coil of wire, a sleeve in one end of each coil and the other end of each coil being threaded onto the sleeve end of another coil.]

[2. A conduit for air, composed of a plurality of sections, each section being flexible and united to another section by means of a sleeve so that it can rotate with relation thereto but cannot be moved longitudinally or laterally thereof, each section having therein long helical slots for the passage of air.]

[3. A conduit for air, composed of a plurality of uniform sections, each section being formed of a coil of wire and means including a sleeve to unite each section to another section to form a conduit of uniform inner diameter.]

[4. In a conduit for air, a plurality of elements forming said conduit, each element being formed of a coil of wire, one end of each coil being threaded into one end of another coil, so that each coil cannot move longitudinally with respect to the other coil and frictional means to prevent the threaded parts of the coils moving laterally with relation to each other.]

*5. In a conduit for internally aerating grain or the like in storage, a plurality of elements forming said conduit, each element being formed of a coil of wire-like material with adjacent convolutions in the intermediate portion of the elements being spaced apart longitudinally of the element to provide a helical slot for the passage of air, and a sleeve in one end of each coil, the other end of each coil being threaded onto the sleeve end of another coil.*

*6. In a conduit for internally aerating grain or the like in storage, a plurality of elements forming said conduit, each element being formed of a coil of wire-like material with adjacent convolutions in the intermedite portion of the elements being spaced apart longitudinally of the element to provide a helical slot for the passage of air, one end of each coil being threaded into one end of another coil to retain the coil ends against relative longitudinal movement, and connecting means to prevent the threaded parts of the coils moving laterally with respect to each other and permitting free flow of air within the conduit.*

*7. In a conduit for internally aerating grain or the like in storage, a plurality of flexible elements fastened end to end to form said conduit, each element being formed of a coil of wire-like material, the convolutions at each end of each coil being spaced apart a distance less than the diameter of the wire-like material and the intermediate convolutions being spaced apart a distance substantially greater than the distance between end coils to provide free circulation of air from the conduit, one end of each coil being threaded directly into one end of another coil to retain the coil ends against relative longitudinal and lateral movement.*

*8. In a conduit for internally aerating grain or the like in storage, a plurality of elements forming said conduit, each element being formed of a coil of wire-like material with adjacent convolutions in the intermediate portion of the elements being spaced apart longitudinally of the element to provide a helical slot for the passage of air, and means connecting adjacent ends of said elements, said connecting means being formed of a coil of wire-like material and having a diameter greater than the diameter of the ends of said elements, the adjacent ends of said elements being threaded into opposite ends of said connecting means.*

References Cited in the file of this patent or the original patent

UNITED STATES PATENTS

| | | |
|---|---|---|
| Re. 11,829 | Poindexter | June 5, 1900 |
| 399,540 | Lee | Mar. 12, 1889 |
| 809,880 | Woolldridge et al. | Jan. 9, 1906 |
| 1,188,485 | Pruyn | June 27, 1916 |
| 1,633,798 | Taylor | June 28, 1927 |
| 1,664,686 | Hunter | Apr. 3, 1928 |
| 2,396,059 | Roberts | Mar. 5, 1946 |

FOREIGN PATENTS

| | | |
|---|---|---|
| 21,700 | Great Britain | Oct. 14, 1908 |
| 305,969 | Great Britain | Feb. 13, 1929 |
| 327,483 | Italy | Jan. 27, 1934 |